United States Patent [19]

Ng

[11] Patent Number: 4,837,587
[45] Date of Patent: Jun. 6, 1989

[54] NON-IMPACT PRINTER WITH NONUNIFORMITY CORRECTION

[75] Inventor: Yee S. Ng, Fairport, N.Y.

[73] Assignee: Eastman Kodak Company, Rochester, N.Y.

[21] Appl. No.: 140,193

[22] Filed: Dec. 31, 1987

[51] Int. Cl.$^4$ .............................................. G01D 9/42
[52] U.S. Cl. .................................... 346/108; 358/296
[58] Field of Search .................... 346/107 R, 108, 160; 358/296

[56] References Cited

U.S. PATENT DOCUMENTS

| | | | |
|---|---|---|---|
| 4,367,533 | 1/1983 | Wiener | 364/519 |
| 4,408,868 | 10/1983 | Thomas et al. | 355/14 R |
| 4,521,814 | 6/1985 | Ono et al. | 358/296 |
| 4,621,271 | 11/1986 | Brownstein | 346/76 PH |
| 4,623,242 | 11/1986 | Hayashi et al. | 355/14 R |
| 4,727,428 | 2/1988 | Futatsugi et al. | 346/107 R |
| 4,750,010 | 6/1988 | Ayers | 346/107 R |

OTHER PUBLICATIONS

Research Disclosure, Nov. 1987, No. 28346, pp. 693–697.
T. Nishimura et al., Electrophotographic Color Printing Using Elliptical Laser Beam Scanning Method, Journal of Imaging Technology, vol. 12, No. 6, 1986, pp. 329–333.
N. Kawamura et al., Half-Tone Reproduction on Digital Color Printers Based on Electrophotography, Electrophotography, 24(3), pp. 2–11 (1985).

*Primary Examiner*—C. L. Albritton
*Assistant Examiner*—Mark Reinhart
*Attorney, Agent, or Firm*—Norman Rushefsky

[57] ABSTRACT

A nonimpact print apparatus employing, for example, a printhead comprising a bank of light emitting diodes (LED's) provides correction for nonuniformities in light output of the LED's. A binary type of driver is provided for activating each LED in response to the presence of a data bit and a strobe pulse determines the period of activation. Certain LED's are additionally activated both before and after data activation using respective strobe pulses for correction for relative differences in emissions between such LED's and other LED's not requiring correction. The use of correction pulses prior to and subsequent to activation for the data pixel provides for more symmetrical exposure corrected dot-like image elements.

2 Claims, 6 Drawing Sheets

NON-IMPACT PRINTER WITH NONUNIFORMITY CORRECTION

CROSS REFERENCE TO RELATED APPLICATIONS

This application is related to U.S. Application Serial No. 140,195, filed on even date herewith in the name of the same inventor and entitled "Reproduction Apparatus."

BACKGROUND OF THE INVENTOR

1. Field of the Invention

The present invention relates to reproduction apparatus comprising non-impact print apparatus employing plural recording elements for recording dot-like elements.

2. Brief Description of the Prior Art

In the prior art as exemplified by U.S. Application Ser. No. 000,295, filed Jan. 2, 1987 and now U.S. Pat. No. 4,750,010 in the name of Charles E. Ayers et al and entitled, "Circuit for Generating Center Pulse-Width Modulated Waveforms and Non-Impact Printer Using Same," non-impact print apparatus is described which comprises a plurality of individually addressable and energizable point-like recording elements such as light emitting diodes (LED's) arranged for exposing points or dots upon a photoreceptor during movement thereof relative to the recording elements. Binary driver circuits are provided for simultaneously energizing the recording elements in response to data bit input signals applied to the driver circuits. As used herein, a binary driver circuit is one for activating a recording element if there is a data bit indicating the element is to be activated and the recording element is activated for a time period determined by a strobe signal to form a dot-like element or pixel. A binary driver circuit is distinguished from a grey-scale driver circuit which has the capability of forming each pixel in accordance with a multible bit data signal. As used herein, the dot-like elements or pixels referred to are descriptive of the basic or micropixel dot-like printed elements and not to combinations of individual pixels into patterns of fatter dots which are also known as superpixels. In the print apparatus described in the above-referred to prior art application correction for nonuniformity in relative light output of the LED's is provided employing a plurality of strobe lines having different strobe times. The LED's are attached to appropriate strobe lines in accordance with their relative light emission characteristics, i.e., LED's tending to provide lower light output are attached to strobe lines having an activation time or relatively longer duration than other LED's.

In this binary driven type printer no provision is made for creating pictorial information with pixels of smaller size than that used for creating line-type information. Description in the above-referred to prior art for creating pixels of different size are described in terms of a grey scale driven printer wherein multiple bits of data are required to determine exposure time for forming each pixel. It is therefore an object of the invention to provide a printer of the binary driven type for printing generally symmetrically shaped exposure corrected pixels which is also capable of printing pixels of different size in accordance with the type of information to be printed.

SUMMARY OF THE INVENTION

The above object and others which will become apparent in reading the specification below are realized by apparatus for printing information comprising:
a printhead having a plurality of dot-like printing elements for recording on a recording member;
means for moving the recording member past the printhead;
means for activating particular printing elements in accordance with recording data related to the information to be printed to reproduce the data using dot-like image elements; and
means for compensating for the nonuniform output of some of the activated printing elements activated by further activating such some of the activated recording elements requiring compensation with additional activations that are provided at times both immediately before and after a respective data activation to provide for relatively symmetrical dot-like image elements.

DESCRIPTION OF THE PREFERRED APPARATUS

The apparatus of the preferred embodiment will be described in accordance with an electrophotographic recording medium. The invention, however, is not limited to apparatus for creating images on such a medium, as other media such as photographic film, thermal sensitive, etc., may also be used with the invention.

DETAILED DESCRIPTION OF THE PREFERRED EMBODIMENTS

Because electrophotographic reproduction apparatus are well known, the present description will be directed in particular to elements forming part of, or cooperating more directly with, the present invention. Apparatus not specifically shown or described herein are selectable from those known in the prior art.

Figure 1:
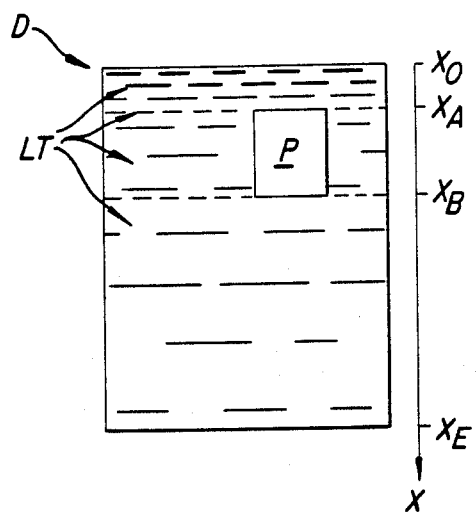
FIG. 1 is an illustration of an original document sheet to be reproduced by the apparatus of the invention.

With reference to FIG. 1, a typical original document sheet D to be reproduced by the apparatus of the invention includes a continuous tone pictorial portion "P" that is surrounded by printed line type information "LT."

Figure 2:
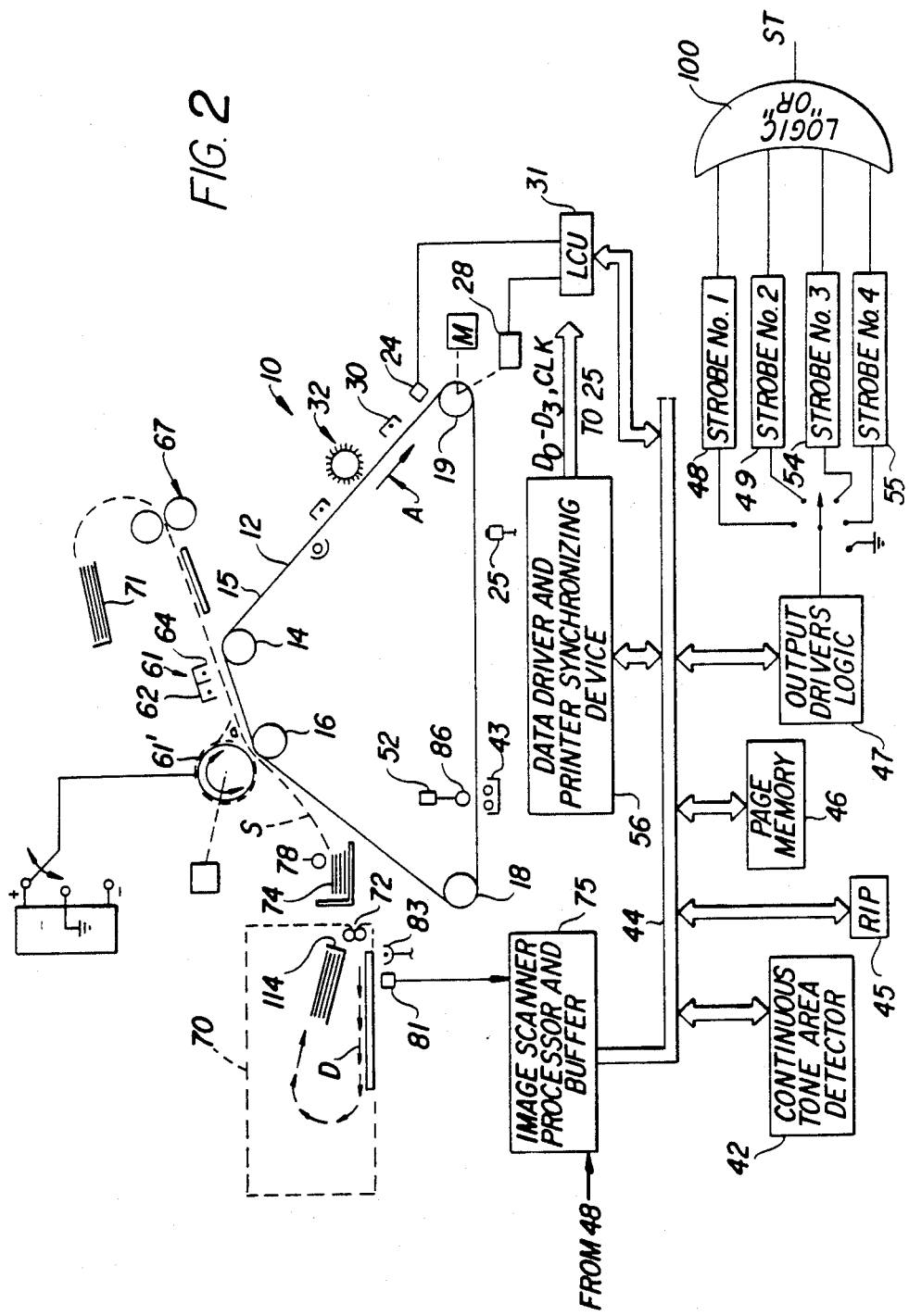
FIG. 2 is a schematic of a printing apparatus made in accordance with the invention.

With reference now to FIG. 2, an electrophotographic reproduction apparatus 10 includes a recording medium or photoreceptor such as a photoconductive web 12 or other photosensitive medium that is trained about four transport rollers 14, 16, 18 and 19, thereby forming an endless or continuous web. Roller 19 is coupled to a driver motor M in a conventional manner. Motor M is connected to a source of potential when a switch (not shown) is closed by a logic and control unit (LCU) 31. When the switch is closed, the roller 19 is driven by the motor M and moves the web 12 in a clockwise direction as indicated by arrow A. This movement causes successive image areas or image frames of the web 12 to sequentially pass a series of electrophotographic work stations of the reproduction apparatus.

For the purposes of the instant exposure, several work stations are shown along the web's path. These stations will be briefly described.

First, a charging station 30 is provided at which the photoconductive surface 15 of the web 12 is sensitized by applying to such surface a uniform electrostatic primary charge of a predetermined voltage. The output of the charger may be controlled by a grid connected to a programmable power supply (not shown). The supply is, in turn, controlled by the LCU 31 to adjust the voltage level Vo applied onto the surface 15 by the charger 30.

At an exposure station an electrostatic image is formed by modulating the primary charge on an image area of the photoconductive surface with selective energization of point-like radiation sources in accordance with signals provided by a data source to be described. The point-like radiation sources are supported in a printhead 25 also to be described in more detail below.

A development station 43 includes developer which may consist of iron carrier particles and electroscopic toner particles with an electrostatic charge opposite to that of the latent electrostatic image. Developer is brushed over the photoconductive surface of the web 12 and toner particles adhere to the latent electrostatic image to form a visible toner particle, transferable image. The development station may be of the magnetic brush type with one or two rollers. Alternatively, the toner particles may have a charge of the same polarity as that of the latent electrostatic image and develop the image in accordance with known reversal development techniques.

The apparatus 10 also includes a transfer station 61 shown with a pair of corona chargers 62, 64 at which the toner image on web 12 is transferred in register to a copy sheet S; and a cleaning station 32, at which the photoconductive surface of the web 12 is cleaned of any residual toner particles remaining after the toner images have been transferred. After the transfer of the unfixed toner images to a copy sheet S, such sheet is transported to a heated pressure roller fuser 67 where the image is fixed to the copy sheet S and the sheet is then tranported to a tray 71. Suitable means such as a transfer drum 61' may be provided for duplex operation in accordance with known techniques.

As shown in FIG. 1, a copy sheet S is fed from a supply 74 by driver roller 78, which then urges the sheet to move forward onto the web 12 in alignment with a toner image.

To coordinate operation of the various work stations with movement of the image areas on the web 12 past these stations, the web has a plurality of indicia such as perforations along one of its edges. These perforations generally are spaced equidistantly along the edge of the web 12. At a fixed location along the path of web movement, there is provided suitable encoding means 24 for sensing web perforations. This sensing produces input signals into the LCU 31 which has a digital computer, preferably one or more microprocessors. The LCU has a stored program responsive to the input signals for sequentially actuating, then de-actuating, the work stations as well as for controlling the operation of many other machine functions. Additional encoding means 28 may be provided as known in the art for providing more precise timing signals for control of the various functions of the apparatus 10 as will be described below.

Programming of a number of commercially available microprocessors is a conventional skill well understood in the art. This disclosure is written to enable a programmer having ordinary skill in the art to produce an apropriate control program for the one or more microprocessors used in this apparatus. The particular details of any such program would, of course, depend on the architecture of the designated microprocessor(s).

Figure 3:
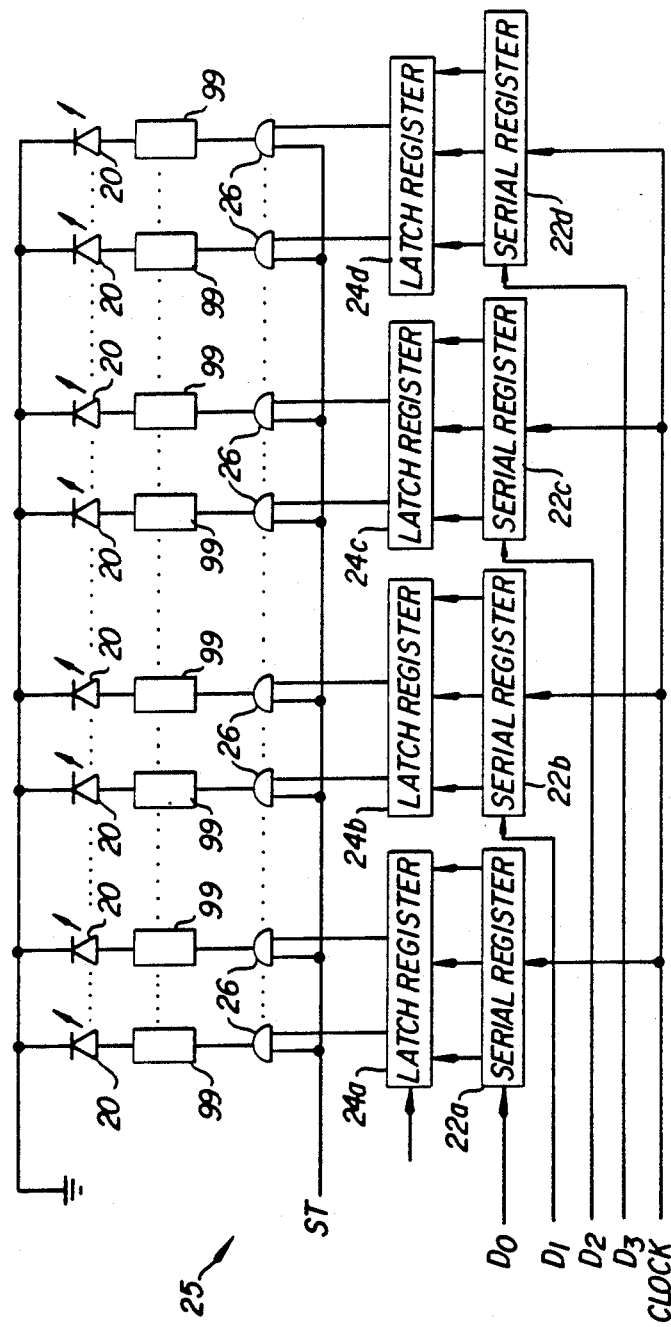
FIG. 3 is a block diagram of circuitry used in forming a printhead for use with the printing apparatus of FIG. 2.

With reference to both FIGS. 2 and 3, the printhead 25, as noted, is provided with a multiplicity of energizable point-like radiation sources 20, preferably light-emitting diodes (LED's). Optical means (not shown) may be provided for focusing light from each of the LED's onto the photoconductive surface. The optical means preferably comprises an array of optical fibers such as sold under the name Selfoc, a trademark for a gradient index lens array sold by Nippon Sheet Glass, Limited. Due to the focusing power of the optical means, a row of emitters will be imaged on a respective transverse line on the recording medium.

With reference to FIG. 3, the printhead 25 comprises a suitable stationary support with a series of LED chip arrays mounted thereon. As is well known, each of the LED chip arrays includes, for example, 128 LED's arranged in a single row. These chips are also arranged end-to-end in a row and where thirty-eight LED chip arrays are so arranged, the printhead will extend across the width of the web 12 and include 4864 LED's arranged in a single row. To each side of this row of LED's there may be provided, for example, thirty-eight identical driver chips. Each of these driver chips include circuitry for addressing the logic associated with each of 64 LED's to control whether or not each of the LED's should be energized as well as current driver circuitry 99 to control the level of current to each of the LED's controlled by that driver chip 40. Two driver chips are thus associated with each LED chip array. Each of the two driver chips will be coupled for driving of alternate LED's, i.e., one of the driver chips will drive the even numbered LED's and the other driver chip will drive the odd numbered LED's in a particular LED chip array. Thus, one driver chip will drive the 64 odd numbered LED's of the 128 LED's in the array and the other driver chip will drive the 64 even numbered LED's of these 128 LED's. Only some of the even numbered LED's are illustrated in FIG. 3, it being understood that many more LED's are present.

As may be noted in FIG. 2, the original document sheet D forms a part of a multisheet document supported in a recirculating feeder tray 70. A vacuum drive roller (not shown) under control of the LCU feeds the document D face down through metering rollers 72 which are adapted to feed the document D past an image scanning head 81 formed of say a conventional CCD array and provide signals to a conventional image scanner processor and buffer indicative of the movement of the sheet. A lamp 83 provides a narrow line of illumination, upon the document D and reflections thereof off the document D are sensed by the image scanning array to provide signals indicative of density information thereon. This output of the image scanner array is fed to the image scanner processor and buffer 75. In order to determine which areas of the original fall within the continuous tone area "P", the output of the data from the image scanner processor and buffer 75 is introduced into a continuous tone area detector 42 to identify the boundaries of the continuous tone information. Circuitry for performing this function are well known, for example, see U.S. Pat. No. 4,194,221 to Stoffel, issued Mar. 18, 1980. In other cases, the boundary defining the continuous tone picture can be inputted via a digitizing tablet or the image information and boundary data may be provided via a host computer, etc. The data representing the scanned image on document D along with data representing the boundaries of the continuous tone area P are fed over bus 44 to a raster image processor (RIP) 45. The RIP 45 processes this data and formats same in accordance with well known techniques and the output thereof is fed over to a page memory 46 wherein a page of rasterized data to be printed is stored. The output image between the boundaries of $X_A$ and $X_B$ which contains the pictorial information will be processed to produce images at $400 \times 800$ addressable points per square inch of output information. In areas other than between $X_A$ and $X_B$, the output image is processed at $400 \times 400$ addressable points per square inch. The data information identifying the location of the pictorial information is stored in the LCU. This information may simply comprise the coordinates (see FIG. 1) $X_A$ and $X_B$ referenced relative to a leading edge $X_O$ of document D.

Figure 4A:
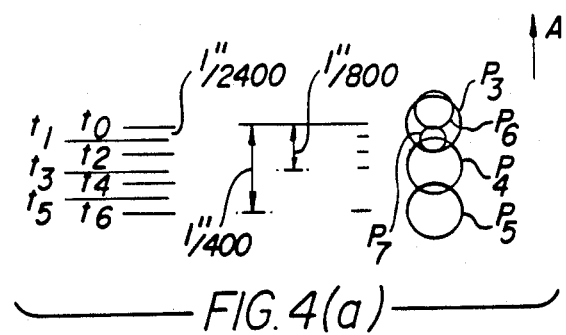
FIG. 4 is an illustration of a plurality of exposure points made with apparatus of the invention.
Figure 4B:
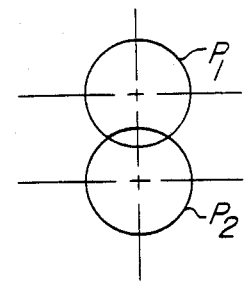

In response to pulses from encoders 24 and 28 identifying a new image frame on a photosensitive web, the LCU provides an output signal to the Page Memory to remove one line of data. This data is fed to a conventional output device for formatting the data and synchronizing the operation thereof. This output device is illustrated by the data driver and printer synchronizing device 56. This data, indicated in FIG. 3 by lines $D_0$–$D_3$, is fed under clock control to an appropriate serial data shift register 22a, 22b, 22c and 22d (for the even numbered LED's) until 4864 bits of data, one for each of the LED's, is stored in the serial registers for the odd and even numbered LED's. Upon a signal from the LCU, the data (for the illustrated even numbered LED's) is shifted in parallel to latch registers 24a, 24b, 24c and 24d enabling the next line of data to be introduced into the serial shift registers. In response to an encoder pulse or other suitable pulse indicating the timing for firing the next line for printing of dots, the LCU causes the output drivers logic device 47 to enable a trigger circuit providing a timed strobe signal. This strobe signal is fed over line ST to one input of a logic AND gate 26 associated with each LED. The other input of AND gate 26 is provided with a data bit from the latch register representing whether or not a dot is to be printed at this time. Assuming a dot is to be printed, a respective LED is enabled for a time period predetermined by the strobe signal. As may be noted from FIG. 2, four possible strobe signals may be selected from the following trigger devices: strobe device #1(48), strobe device #2(49), strobe device #3(54) and strobe device #4(55). Strobe #1 has a duration, in this example, of $100\mu$ sec. and the the strobe #2 a duration of $50\mu$ sec. While reproducing the portion of the document between $X_O$ and $X_A$ the strobe device #1 is used and is selected by logic device 47 in response to signals from the LCU. Adjacent LED's are spaced so as to provide 400 dots per inch (157 per cm). The encoder 28 provides pulses at the rate of 1/2400 per inch (0.01 mm) of travel of the web 12. For exposing the text data in the areas between $X_O$ to $X_A$ and $X_B$ to $X_E$, it is sufficient that for line type of information that the exposure be made on the basis of 400 lines per inch (157 per cm) and that encoder pulses in between be effectively ignored. For this exposure, strobe #1 is employed and exposure pixels of two consecutive pixels ($P_1$ and $P_2$) in the in-track direction of movement of web 12 are illustrated at FIG. 4(b). For the line type and pictorial information between $X_A$ and $X_B$, increased grey scale rendition is provided, particularly, to the pictorial information by exposing the photoconductor web on the basis of 800 lines per inch (315 per cm) in the in-track direction. To do this, the duration of each LED exposure in this area is reduced to $50\mu$ sec. with the use of strobe #2(49) which is activated for each 1/800 inches (0.032 mm) of web movement. Note that the additional number of exposures to the pictorial area is accompanied with a corresponding reduction in exposure time for each pixel. In FIG. 4(a), the pixels produced by three successive strobe signals are illustrated by $P_3$, $P_4$ and $P_5$. As LED's are known to be nonuniform light emitters, it is highly desirable to ensure proper rendition that correction be provided to exposures, particularly, in the area reproducing the pictorial information. To this end, additional strobe devices #3 (54) and #(55) are provided. Strobe device #3 provides a strobe signal of $10\mu$ sec. duration while strobe device #4 provides a strobe signal of $5\mu$ sec. Thus, for exposures in the area $X_A$ to $X_B$ correction may be provided of $5\mu$ sec., $10\mu$ sec., or $15\mu$ sec. (strobes #3 and #4 both being used) in addition to the nominal strobe value of $50\mu$ sec. from strobe device #2 (49).

During manufacture of the printhead 25, each LED is tested to determine whether or not it needs correction in terms of requiring additional light output since similar LED's tend from LED to LED to emit variable amounts of light even though provided with identical driving currents. To this end, data are stored in correction ROM memories and the apparatus will now be described with reference to FIG. 5 and discussion will be provided as to how correction is obtained.

Figure 5:
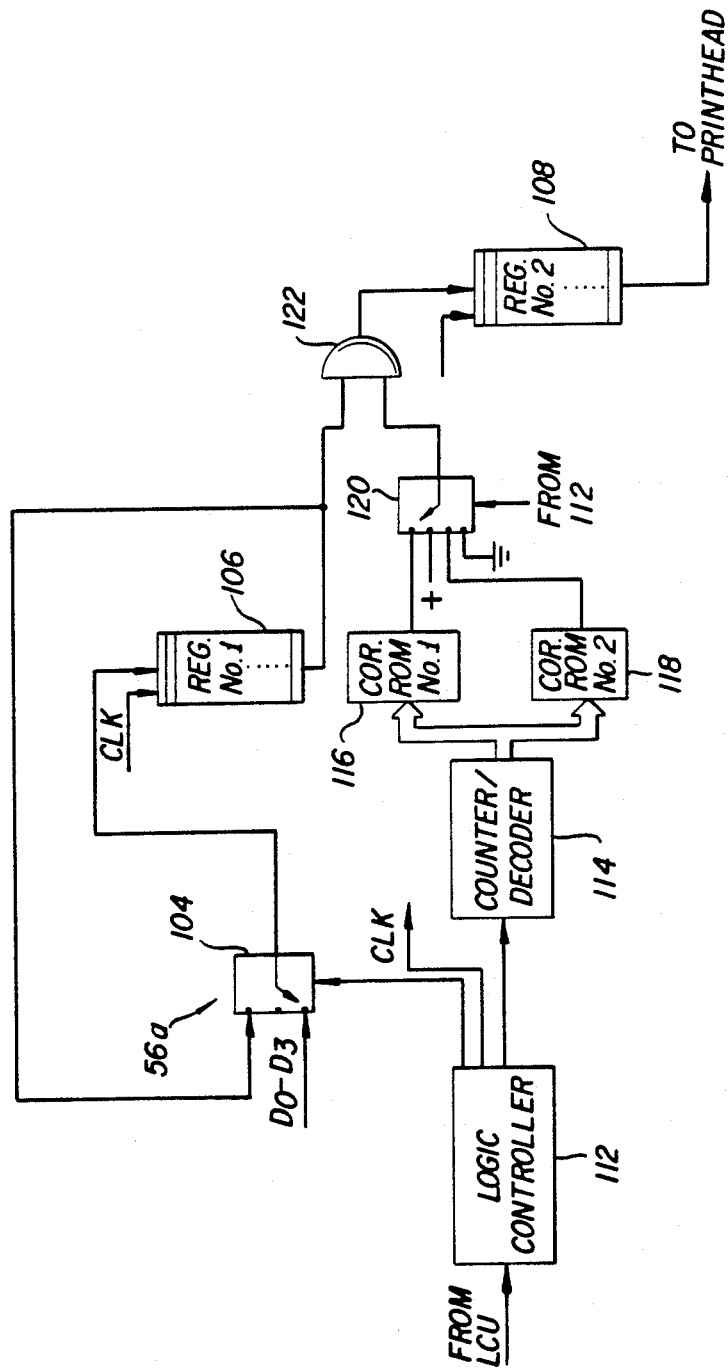
FIG. 5 is a block diagram of a circuit interface for driving data to the printhead of FIG. 3.

As may be noted in FIGS. 2 and 3, operation of the apparatus 10 is such that the outputs of the strobe devices #1, #2, #3 and #4 are subject to a logic "OR" operation by "OR" device 100 to cause all strobe signals to be outputted on the single strobe line ST. With reference now to FIG. 5, a portion 56a of the data driver and printer synchronizing device 56 is shown. The rasterized print data for a line of dots to be printed is provided to one input of a solid state switch 104. Actually, since data for line portions $D_O$–$D_3$ are handled simultaneously, the devices described in FIG. 5 are actually multistage devices with single stages being illustrated for facilitating description thereof. For reproduction of line-type or text, etc., (where no correction may be needed) the data $D_0$–$D_3$ is fed by switch 104 to shift register #1 (106) and then output through AND gate 122 to the printhead 25 (FIG. 3) via shift register #2 (108). Switch 120, which is the other input to AND gate 122, is switched to a source of logic high potential indicated by (+) to allow all data from register 106 to pass through the gate. In the case of reproducing areas containing some pictorial information where correction is advantageous, the real data input on line $D_0$–$D_3$ is fed by switch 104 to register 106. This data is then output from the shift register to one input of AND gate 122. The second input of AND gate 122 is receiving correction data from correction ROM #1 (116) via switch 120. Correction ROM's #1 (116) and #2 (118) are provided to store data concerning the characteristics of each LED. Thus for each LED, two bits of data are stored; i.e., 1. Does that LED require a 10µs correction? (yes or no) and 2. Does that LED require a 5µs correction? (yes or no). While two separate ROM's are described for illustrative purposes, a single ROM storing two bits of data for each LED is also contemplated. A switch 120 operated under signal control by logic controller 112 selects the output of the ROM being interrogated. Thus, only those LED's that will be enabled for real data will be provided with a correction pixel from correction ROM #1. This correction data is stored in shift register #2 (108) and then output to the printhead shift registers 22a, 22b, 22c and 22d of FIG. 3 at the appropriate time for printing using the strobe device #3 which provides a 10µs correction pulse forming $P_6$ in FIG. 4(c) at time $t_0$. The real data is also recirculated back to register 106 via switch 104 for use in printing the data pixels $P_3$ with strobe device #2 at time $t_1$. For this operation, switch 120 switches to receive an input from its logic high (+) terminal to input this to one input of AND gate 122. The real data is output from register 106 and input to the other input of AND gate 122. The real data is thus output to shift register 108 and to the printhead for printing the data pixels $P_3$ using a strobe signal of 50µs duration. The real data is also again recirculated back through switch 104 to register 106 for printing of the next set of correction pixels $P_7$ using correction ROM #2 (118). The real data is serially input into one input of AND gate 122 and "ANDed" with correction data from correction ROM #2 which is input through switch 120 to the second input of AND gate 122. This correction data is then output through register 108. to the printhead registers 22a, 22b, 22c, and 22d, etc. of printhead 25 (FIG. 3) for printing correction pixels $P_7$ using strobe device #4 which has a pulse duration of 5µs . Thus, only those LED's that will be enabled for real data will receive suitable correction (if required in accordance with correction characteristi cs stored in ROM #2). The logic controller 112, counter decoder 114 function as to synchronize the various flows of data and switching in accordance with the requirements described herein. With this circuit, more symmetric corrected pixels are formed as illustrated in FIG. 4a. Correction pixels for data pixels $P_4$, $P_5$ are not shown for purposes of maintaining clarity of the illustration.

Figure 6:
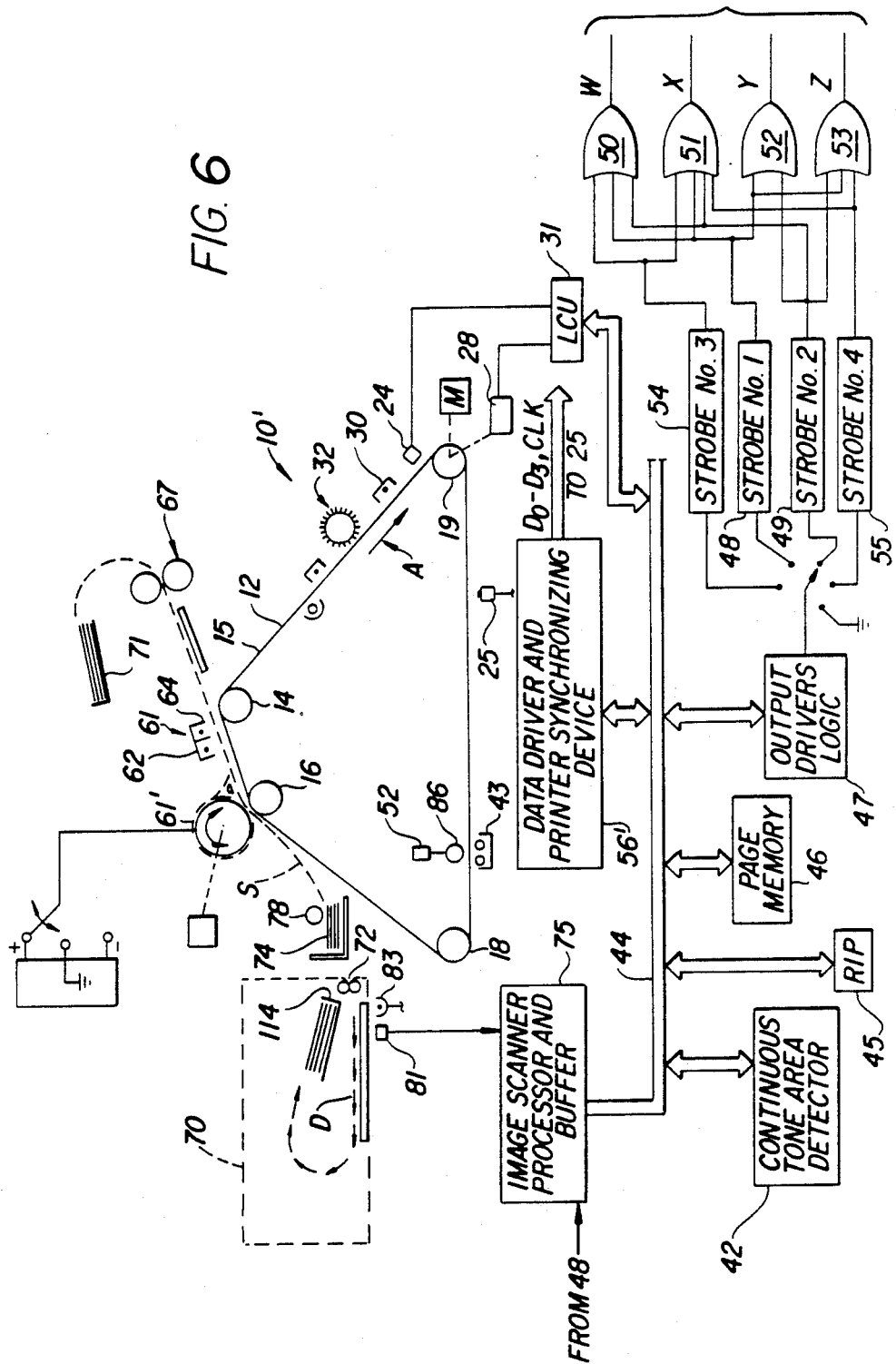
FIG. 6 is a schematic of a second embodiment of printing apparatus made in accordance with the invention.

In the apparatus of FIGS. 1, 2, 3 and 5, a single strobe line is employed requiring correction data to be generated in order to create correction pixels. As printheads are available having several different strobe lines to one of which the LED's may be selectively attached, the aparatus of FIGS. 6 and 7 will now be described for creating corrected pixels of relatively symmetric shape without the need to generate correction data. Reference will now be made to the apparatus of FIGS. 6 and 7, where in like numerals refer to parts similar to that described with reference to the apparatus of FIGS. 2, 3 and 5. Description will now be provided directed to the distinguishing aspects between the embodiment of FIGS. 6 and 7 and that of FIGS. 2, 3 and 5.

In response to pulses from encoders 24 and 28 identifying a new image frame on a photosensitive web, the LCU provides an output signal to the Page Memory to remove one line of data. This data is fed to a conventional output device for formatting the data and synchronizing the operation thereof. This output device is illustrated by the data driver and printer synchronizing device 56'. This data, indicated in FIGS. 6 and 7 by lines $D_0$–$D_3$, is fed under clock control to an appropriate serial data shift register (see FIG. 7) 22a, 22b, 22c and 22d (for the even numbered LED's) until 4864 bits of data, one for each of the LED's, is stored in the serial registers for the odd and even numbered LED's. Upon a signal from the LCU, the data (for the illustrated even numbered LED's) is shifted in parallel to latch registers 24a, 24b, 24c and 24d enabling the next line of data to be introduced into the serial shift registers. In response to an encoder pulse or other suitable pulse indicating the timing for firing the next line for printing of dots, the LCU causes the output drivers logic device 47 to enable a trigger circuit providing a timed strobe signal. The output of the strobe is introduced to each of four logic OR gates 50-53. The output lines W, X, Y and Z of the logic OR gates are fed to one input of a logic AND gate 26 associated with each LED. The other input of AND gate is provided with a data bit from the latch register representing whether or not a dot is to be printed at this time. Assuming a dot is to be printed, a respective LED is enabled for a time period predetermined by the strobe signal. As may be noted from FIG. 6, four possible strobe signals may be selected from the following trigger devices: strobe device #1(48), strobe device #2(49), strobe device #3(54) and strobe device #4(55). Strobe #1 has a duration, in this example, of 100µ sec. and the strobe #2 a duration of 50µ sec. While reproducing the portion of the document between $X_O$ and $X_A$, the strobe device #1 is used and is selected by logic device 47 in response to signals from the LCU. Adjacent LED's are spaced so as to provide 400 dots per inch (157 per cm). The encodeer 28 provides pulses at the rate of 1/2400 per inch (0.01 mm) of travel of the web 12. For exposing the text data in the areas between $X_O$ to $X_A$ and $X_B$ to $X_E$, it is sufficient that for line type of information that the exposure be made on the basis of 400 lines per inch (157 per cm) and that encoder pulses in between be effectively ignored. For this exposure, strobe #1 is employed and exposure pixels of two consecutive pixels ($P_1$ and $P_2$) in the in-track direction of movement of web 12 are illustrated at FIG. 4(b). For the line type and pictorial information between $X_A$ and $X_B$, increased grey scale rendition is provided, particularly, to the pictorial information by exposing the photoconductor web on the basis of 800 lines per inch (315 per cm) in the in-track direction. To do this, the duration of each LED exposure in this area is reduced to 50µ sec. with the use of strobe #2(49) which is activated for each 1/800 inches (0.032mm) of web movement. Strobe device #3 provides a strobe signal of 10µ sec. duration while strobe device #4 provides a strobe signal of 5µ sec. Thus, for exposures in the area $X_A$ to $X_B$ correction may be provided of 5µ sec., 10µ sec., or 15 µsec. (strobes #3 and #4 both being used) in addition to the nominal strobe value of 50µ sec.

During manufacture of the printhead 25', each LED is tested to determine whether or not it needs correction in terms of requiring additional light output. Those LED's requiring say 10% more "on-time" are attached to line Z which receives an input from strobe device #4. Those LED's requiring more "on-time" of say 20% are attached to line W which receives an input from strobe device #3. Those requiring more "on-time" of say 30% are attached to line X which receives an input from both strobe devices #3 and #4. Those LED's requiring no correction exposure are attached to line Y which receives an input from none of the strobe devices used for correction exposures, but only strobe signals of strobe devices #1 and #2. Lines W, X, Y, and Z also each receive strobe signals of strobe devices #1 and #2. In operation, the output drivers logic device 47 only switches on strobe device #1 (48) for each 1/400 of an inch of web drive where the printing of line type data corresponding to document areas $X_O$ to $X_A$ and $X_B$ to $X_E$ (end of document) is to be made.

As encoder 28 tracks the web at each 1/2400 inches of movement the logic devices 47 switches to a null position where no strobe signal is provided at times $t_1$, $t_2$, $t_3$, $t_4$ and $t_5$ until at $t_6$ the next pixel $P_2$ is to be exposed (pixel $P_1$ having been exposed at time $t_0$). At time $t_6$ the output drivers logic device 47 once again switches to strobe device #1 to trigger a strobe signal of 100μs duration over lines W, X, Y and Z. When the printheat 25' is exposing areas of the image frame on web 12 used to reproduce portions of document sheet D between coordinates $X_A$ to $X_B$ the output drivers logic device 47 triggers strobe device #2 at each 1/800 inches of photoconductor web travel, i.e. say at times $t_1$, $t_4$, etc. and at times $t_0$, $t_3$; $t_2$, $t_5$ triggers respectively strobe devices #3 and #4 used for correction. In the example of this apparatus, strobe device #3 is triggered at times $t_0$ and $t_3$ and strobe device #4 is triggered at times $t_2$ and $t_5$. In the apparatus described above, it will be noted that text in the area within the coordinates $X_A$ to $X_B$ is also reproduced at 400 ×800 resolution to simplify the circuitry to the printhead.

Figure 7:
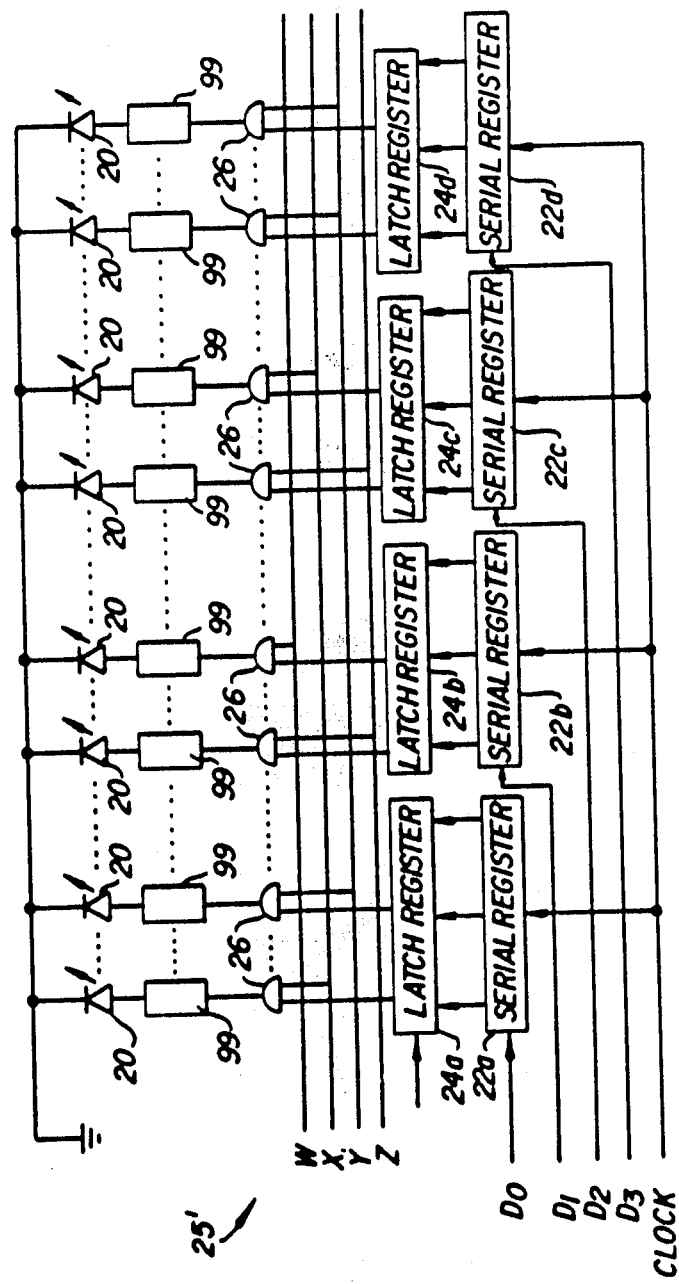
FIG. 7 is a block diagram of circuitry used in forming a printhead for use with the printing apparatus of FIG. 5.

In the printhead 25' of FIG. 7, multiple strobe lines W, X, Y and Z are required with separate connection of each LED to a respective one of the four strobe lines. This adds some manufacturing cost to producing such a printhead. A compromise in cost versus quality may be made based on the assumption that the group of 64 odd numbered LED's in any LED array will have similar characteristics and will have current driven therethrough from a single driver chip that is adapted to drive all these 64 LED's. A similar statement may be made for the even numbered LED's in that array. Thus, it is contemplated in my invention that an integrated circuit driver chip incorporating the serial registers, latch register and current driver for a group of LED's be connected to one of the strobe lines W, X, Y or Z based on say the average light output of the 64 LED's under control of that driver chip. Thus, all 64 LED's in that group will receive the appropriate same correction assuming, of course, that only those LED's that are activated to expose pictorial data receive such correction.

While resolution herein is described in terms of the separate pixel exposures of each dot formed on the photoreceptor, it should be appreciated that in forming reproductions of the pictorial portion(s) requiring screening that clusters of such dots or pixels may be used to form larger dots or super pixels such as pixels of the so-called fattening type.

While the invention has been illustrated with regard to reproduction of line-type information such as text with resolution at 400 ×400 dots per square inch and pictorial information at 400×800 dots per square inch the invention contemplates apparatus wherein all information is reproduced at the same resolution or other resolutions which make use of the correction scheme taught herein.

While the invention has been illustrated in connection with a electrophotographic apparatus, other non-impact dot matrix printers such as thermal, electrographic, etc., may also make use of the invention described herein.

The encoder means may be of the type described herein, wherein each line of printing is "tracked" relative to actual photoconductor movement or wherein an encoder signal is "tracked" at the beginning of each frame and pulses artificially created for each line in accordance with approximate photoconductor movement.

The invention has been described in detail with particular reference to preferred embodiments thereof, but it will be understood that variations and modifications can be effected within the spirit and scope of the invention.

I claim:

1. Apparatus for printing information, comprising:
   a printhead having a plurality of dot-like printing elements for recording on a recording member;
   means for moving the recording member relative the printhead;
   means for activating particular printing elements in accordance with recording data related to the information to be printed to reproduce the data;
   means for compensating for the nonuniform output of some of the activated printing elements by further activating such some of the activated printing elements requiring compensation with additional activations that are provided at times both immediately before and after a respective data activation to provide for relatively symmetrical dot-like image elements wherein a compensation activation immediately before a data activation is of different duration than the one immediately after the data activation; and
   wherein the means for activating particular printing elements further includes a plurality of strobe lines, means connecting each printing element with only one of the strobe lines and means for providing different compensation signals on the strobe lines so that printing elements connected to one strobe line are compensated differently from printing elements connected to other strobe lines.

2. The apparatus of claim 1 and wherein the printing elements are light emitting diodes.

* * * * *